J. D. DARBY, B. C. PHILLIPS & E. T. WESTMORELAND.
AUTOMOBILE LIFTING JACK.
APPLICATION FILED JULY 23, 1913.
1,100,011.
Patented June 16, 1914.
2 SHEETS—SHEET 2.
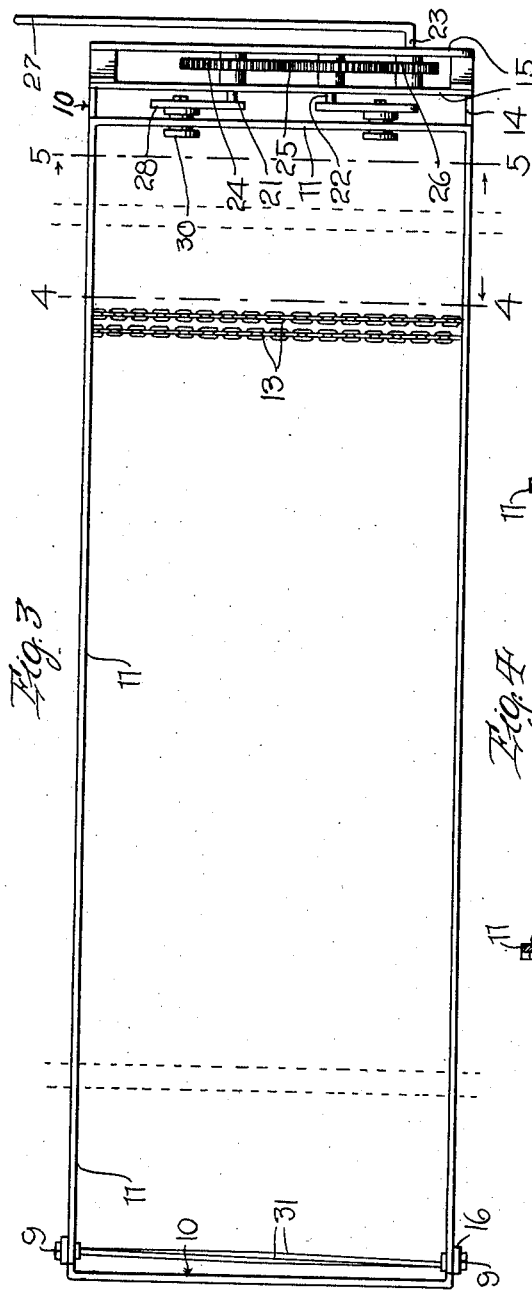
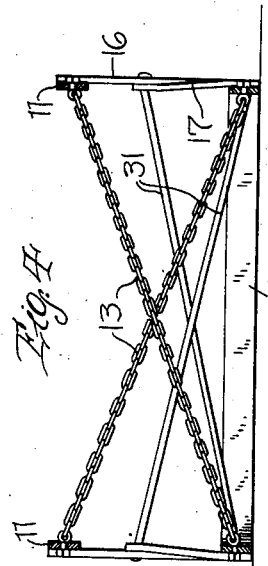
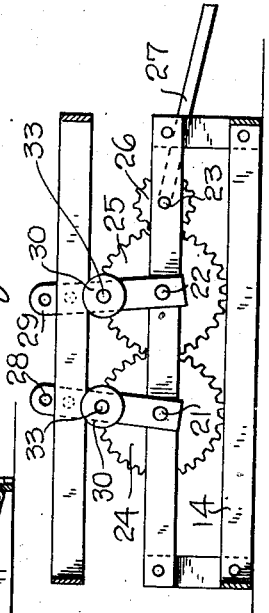
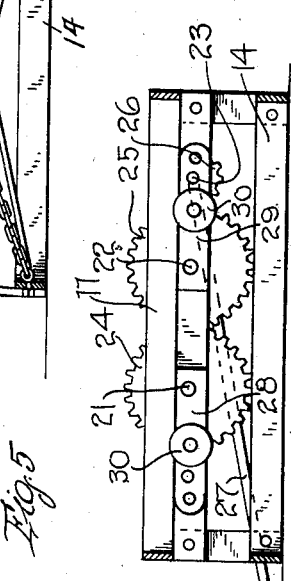
Inventors
J. D. DARBY,
B. C. PHILLIPS
E. T. WESTMORELAND.

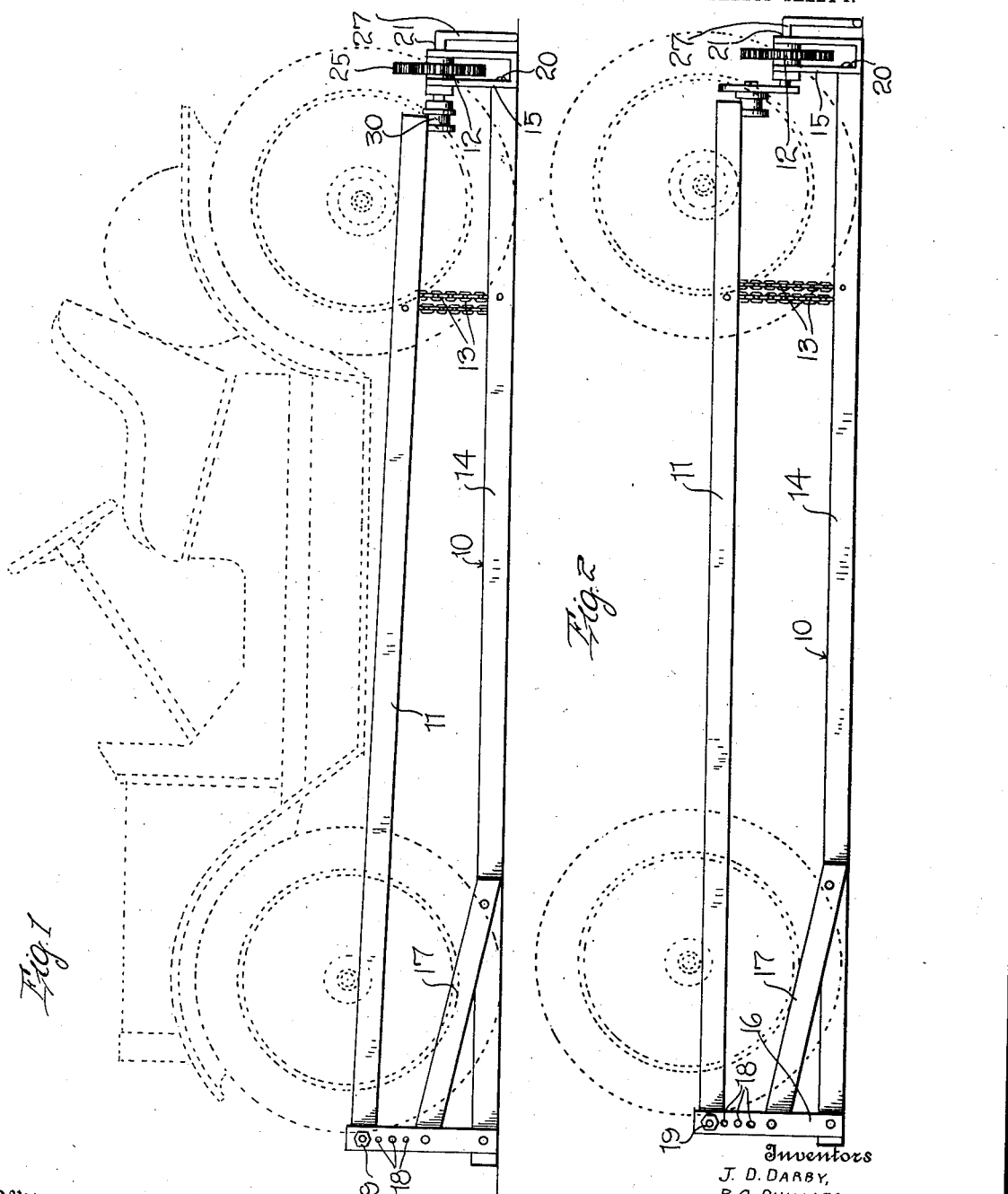

UNITED STATES PATENT OFFICE.

JAMES D. DARBY, BEN C. PHILLIPS, AND EDWIN T. WESTMORELAND, OF CRESCENT, SOUTH CAROLINA; SAID PHILLIPS ASSIGNOR TO SAID DARBY AND WESTMORELAND.

AUTOMOBILE LIFTING-JACK.

1,100,011.          Specification of Letters Patent.          Patented June 16, 1914.

Application filed July 23, 1913. Serial No. 780,823.

*To all whom it may concern:*

Be it known that we, JAMES D. DARBY, BEN C. PHILLIPS, and EDWIN T. WESTMORELAND, citizens of the United States, residing at Crescent, in the county of Spartanburg and State of South Carolina, have invented certain new and useful Improvements in Automobile Lifting-Jacks, of which the following is a specification, reference being had to the accompanying drawings.

This invention relates to automobile lifting jacks, and it more particularly relates to an improved form of stationary lifting jack.

An object of the invention is to provide a lifting jack of this character which is designed to be permanently seated upon the floor of a garage, so that when the automobile is run into the garage, it may be immediately lifted from the floor, for the purpose of relieving the tires of the machine from the constant strain upon the tires, and to allow any of the tires or wheels to be removed or otherwise operated upon with ease and facility.

Another object is to provide a device of this character which is simple in construction, easily manipulated, strong, durable, comparatively inexpensive and thoroughly efficient and practical.

In the accompanying drawings, which supplement this specification, Figure 1 is a side elevation view of the device in its lowered position, an automobile being illustrated in dotted lines in position to be raised by the jack; Fig. 2 is a side elevation view of our improved jack in its operative position for supporting the automobile, as indicated by the wheels shown in dotted lines; Fig. 3 is a top plan view of the device; Fig. 4 is a vertical sectional view on the line 4—4 of Fig. 3; Fig. 5 is a vertical sectional view on the line 5—5 of Fig. 3 in lowered position, and Fig. 6 is a view similar to Fig. 5, taken on the same line, but in its elevated position.

Referring to these drawings, in which similar reference characters correspond with similar parts throughout the several views, our improved lifting jack consists of a stationary frame 10, a movable frame 11, a lifting mechanism 12 and stay chains 13.

The stationary frame consists of a rectangular frame member 14, a bearing frame member 15, apertured standards 16 and brace members 17, said brace members being securely fastened to the frame 14 and the standards 16 for holding the latter rigidly in vertical position. The standards 16 are each provided with a plurality of apertures 18 through which bolts 19 extend for pivotally supporting the front end of the frame 11, and it is obvious that the height of the device may be adjusted by moving the bolt 19 from one of the apertures 18 to the other.

The bearing frame is secured to the rear end of the frame 14 by means of bolts or other securing devices 20, and this frame 15 is apertured, so as to form bearings for the shafts 21, 22 and 23. Upon the shafts 21 and 22 are mounted gear wheels 24 and 25 respectively, which mesh with each other and with a gear wheel 26, the latter being mounted upon the shaft 23. The shaft 23 has a lever arm 27 extending rigidly therefrom, while the shafts 21 and 22 have lifter arms 28 and 29 respectively, extending rarially therefrom. The arms 28 and 29 each carry a roller 30, these rollers being peripherally grooved for the reception of the rear end bar of the frame 11.

The side bars of the frame 11 are preferably above the respective side bars of the frame 10, and these side bars are spaced apart a distance somewhat less than the distance between the wheel hubs of the automobile, so that the axle of the automobile may be moved into contact with the frame 11 when the automobile is run into the garage with its opposite wheels on opposite sides of the lifting jack.

The standards 16 are connected at their tops and bottoms by means of crossed brace rods 31, while the crossed chains 13 connect the rear end portion of the frame 10 to that of the frame 11, so as to prevent relative lateral movement, while allowing relative vertical movement of the frames 10 and 11.

In operation, the device being in the position shown in Fig. 1, the automobile is run astride of the jack until its front axle slides upon the top of the frame 11, adjacent to the front end thereof. Now, it will be seen that the rear axle of the machine is a considerable distance above the rear end of the frame 11, and that the distance between the portion of the frame 11 upon which the front axle rests and the rear end of the frame is more than five times the distance between said portion of the frame 11 and the bolt or pivot 19, so that the advantage of a considerable leverage is obtained for raising the heaviest part of the automobile, viz., the front part, it is also obvious that a considerable leverage is gained by the difference in size of the wheels 25 and 26, while a very great leverage is obtained by means of the operating lever arm 27. Now, as the lever arm 27 is swung upward from the position illustrated in Figs. 1 and 5, the shafts 21 and 22 are rotated thereby, through the medium of the gear wheels, so that the arms 28 and 29 and rollers 30 move the rear end of the frame 11 into contact with the rear axle of the automobile; but before thus coming into contact with the rear axle, the front axle, wheels and tires have been raised, while the arms 28 and 29 have moved into an almost vertical position, so that when the rear end of the automobile is being raised the lifting efficiency is greatly increased, in consequence of the leverage gained by this approximately vertical position of said arms 28 and 29. Just before the lever arm 27 reaches the limit of its swing, the axles 33 of the rollers 30 move through the vertical plane of the respective shafts or axles 21 and 22, and the contact of the lever arm 27 with the floor of the garage, or with the ground, prevents further movement of the lifter arms, and so the automobile is supported with all of its wheels and tires spaced apart from the floor or ground.

Obviously, when it is desired to lower the automobile onto the floor or ground, it is only necessary to move the lever 27 in the direction opposite to that previously described. It is also obvious that, because of the leverage described in the foregoing, a very heavy automobile may be easily raised by a person of ordinary or less than ordinary strength.

It will be seen that we have provided a lifting jack of this character which is fully capable of attaining the foregoing objects in a thoroughly practical and efficient manner.

While the accompanying drawings illustrate what we believe to be the preferred embodiment of our invention, it is to be understood that the invention is not limited thereto, but that various changes may be made in the construction, arrangement and proportions of the parts without departing from the scope of the invention, as defined in the appended claims.

We claim:

1. An automobile jack consisting of a stationary frame, a movable frame having one end pivotally connected to an end of the stationary frame, a bearing member carried by the opposite end of the frame, a pair of intermeshing wheels, axles fixedly secured to the respective intermeshing wheels and being journaled in said bearing member and each carrying a lifter arm, each lifter arm having a roller journaled thereon and supporting the free end of said movable frame, a gear wheel of relatively small diameter intermeshing with one of said pair of gear wheels, and a lever arm fixedly secured to said relatively small gear wheel.

2. An automobile lifting jack comprising a rectangular frame having standards at one end and a bearing member at its other end, shafts journaled in said bearing member and carrying a pair of intermeshing gear wheels and a pair of eccentrically mounted rollers, a movable frame having one end pivotally connected to said standards and having its other end supported by the rollers on a lower level than its pivotally connected end, a relatively small gear wheel intermeshing with one of the first said gear wheels, and a lever arm fixedly secured to said relatively small gear wheel and adapted to be swung through an angle of approximately one hundred and ninety degrees and to co-act with said gear wheels for moving the eccentrically mounted rollers past the vertical planes of the respective shafts, for raising and securely supporting an automobile.

3. An automobile lifting jack comprising a stationary frame, a movable frame having one end movably connected to an end of the stationary frame, a pair of lifter arms pivotally mounted on said stationary frame and extending in opposite directions and each carrying a roller over which the free end of the movable frame is supported, and means for moving the centers of the rollers through the vertical planes of the pivotal connections of the respective arms for raising and supporting said movable frame.

In testimony whereof we hereunto affix our signatures in the presence of two witnesses.

JAMES D. DARBY.
BEN C. PHILLIPS.
EDWIN T. WESTMORELAND.

Witnesses:
D. M. FOWLER,
C. A. FOWLER.